(12) United States Patent
Tamagawa

(10) Patent No.: US 6,979,069 B2
(45) Date of Patent: Dec. 27, 2005

(54) COLOR CONVERSION PROCESSING METHOD, COLOR CONVERSION PROCESSING APPARATUS, AND COLOR CONVERSION PROCESSING PROGRAM STORAGE MEDIUM

(75) Inventor: Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 252 days.

(21) Appl. No.: 10/671,528

(22) Filed: Sep. 29, 2003

(65) Prior Publication Data

US 2004/0061740 A1    Apr. 1, 2004

(30) Foreign Application Priority Data

Sep. 30, 2002  (JP)  .............................. 2002-286095
Dec. 20, 2002  (JP)  .............................. 2002-369487

(51) Int. Cl.[7] .......................... B41J 2/205; G06K 15/00
(52) U.S. Cl. ........................... 347/15; 358/1.9; 358/518
(58) Field of Search ................... 347/15, 43; 358/1.9, 358/515, 518, 540, 448; 382/167

(56) References Cited

U.S. PATENT DOCUMENTS 6,373,997 B1 * 4/2002 Wayner et al. .............. 382/289

6,891,649 B1 * 5/2005 Kondo ........................ 358/527
6,897,988 B1 * 5/2005 Saito et al. .................. 358/515

FOREIGN PATENT DOCUMENTS

| JP | 5-124234 | 5/1993 |
| JP | 2002-139381 | 5/2002 |

* cited by examiner

Primary Examiner—Lamson Nguyen
(74) Attorney, Agent, or Firm—Sughrue Mion, PLLC

(57) ABSTRACT

There is provided a color conversion processing method and the like, which are capable of performing a data processing for images with a common processing system independently of a printer and also capable of performing a flexible alteration of the processing method, even if it is concerned with the printer restricted in the above-mentioned matter. In the event that there is a restriction on a total value of the respective values of CMYK on one pixel for instance, for a respective printer, image data is converted into image data suitable for the printer involved in the restriction. Processing in a printer conversion processing section, which is hitherto performed by the hardware operating processing, is implemented in form of a profile (referred to as a printer processing conversion profile). The printing profile and the printer profile are combined with the printer processing conversion profile to create a combined profile. The color conversion processing is performed in accordance with the combined profile.

5 Claims, 15 Drawing Sheets

COLOR CONVERSION PROCESSING METHOD, COLOR CONVERSION PROCESSING APPARATUS, AND COLOR CONVERSION PROCESSING PROGRAM STORAGE MEDIUM

BACKGROUND OF THE INVENTION

1. Field of the Invention

The present invention relates to a color conversion processing method of converting image data having color information represented in form of a target device use into image data having color information represented in form of a printer use so that a printer reproduces colors to be created using a target device such as a printing machine, a color conversion processing apparatus for converting image data having color information represented in form of a target device use into image data having color information represented in form of a printer use, and a color conversion processing program storage medium storing a color conversion processing program which causes an information processing apparatus such as a computer to operate as such a color conversion processing apparatus.

2. Description of the Related Art

Hitherto, when a printing machine is used to perform a color image printing, it is performed prior to the color image printing that a color printer and the like is used to create a proof image which is extremely similar in color to an image to be printed in the printing machine. When the color printer and the like is used to create the proof image, the proof image is created in such a manner that detected are a color reproduction quality (a printing profile) describing an association between image data and a color of the actual printed matter, which is associated with a printing machine of interest, and a color reproduction quality (a printer profile) describing an association between image data and a color of the image to be actually printed out, which is associated with a printer of interest; the printing profile is combined with the printer profile to create a link profile; and image data for printing is converted into image data for a printer in accordance with the link profile, so that the proof image is created in accordance with the image data for a printer thus converted. In this manner, it is possible to create a proof image greatly close to the actual printed matter in color (cf. for example, Japanese Patent Application Laid Open Gazette Toku-Kai. 2002-139381).

In a case where the printer is a laser printer for forming an image using color toners of for example, C (cyan), M (magenta), Y (yellow), and K (black), there is a possibility that accumulation of a large amount of color toners of C, M, Y, and K upon the same pixel causes a pile of color toners to collapse, so that an image defect brings about. Thus, in some case, the extent of superposition of color toners (total amount of color toners needed for drawing a pixel) is restricted. Also in a case where the printer is an ink jet printer for forming an image using color inks of a number of colors (for example, six colors), there is a possibility that drawing of the same pixel by a large amount of inks causes over-concentration, so that an image defect brings about. Thus, in some case, the total amount of inks needed for drawing a pixel is restricted.

According to such a type of printer, a device signal constituting image data is not used directly to control an amount of toners and an amount of inks for the printer, and the device signal is processed so as to be restricted in order to prevent the occurrence of an image defect.

As a printer conversion processing section for performing such a conversion processing, there is known hardware and software for performing a restriction processing at the time of printing through combination of functions. However, in some method of the conversion processing, it takes a lot of time for the conversion processing and thus it takes a lot of time for printing.

Further, in the event that hardware and software are constructed to perform a restriction processing through combination of functions, it is difficult to alter the hardware and the software, even if a suitable processing method of the restriction is developed. And thus the processing method of the restriction is substantially fixed on a processing method incorporated into a driver of a printer from the first.

SUMMARY OF THE INVENTION

In view of the foregoing, it is an object of the present invention to provide a color conversion processing method, a color conversion processing apparatus, and a color conversion processing program storage medium, which are capable of performing a data processing for images with a common processing system independently of a printer and also capable of performing a flexible alteration of the processing method, even if it is concerned with the printer restricted in the above-mentioned matter.

To achieve the above-mentioned object, the present invention provides a color conversion processing method comprising steps of:

preparing three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

combining the three types of profiles to create a combined profile providing an association between the coordinates on the target color space and the coordinates in the area subjected to the restriction on the first printer color space; and performing a color conversion processing in which image data for a target having color information represented by the coordinates on the target color space is converted into image data for a printer having color information represented by the coordinates in the area subjected to the restriction on the first printer color space in accordance with the combined profile.

To achieve the above-mentioned object, the present invention provides a color conversion processing apparatus comprising:

a memory section that stores three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

a profile integration section that combines the three types of profiles to create a combined profile providing an association between the coordinates on the target color space and the coordinates in the area subjected to the restriction on the first printer color space; and a color conversion processing section that performs a color conversion processing in which image data for a target having color information represented by the coordinates on the target color space is converted into image data for a printer having color information represented by the coordinates in the area subjected to the restriction on the first printer color space in accordance with the combined profile.

In the color conversion processing apparatus according to the present invention as mentioned above, it is preferable that the color conversion processing apparatus further comprises a profile designation section that designates a pair of a desired target profile and a desired printer profile, wherein the profile integration section combines the target profile and the printer profile designated by the profile designation section with a printer processing conversion profile associated with the printer profile to create the combined profile.

To achieve the above-mentioned object, the present invention provides a color conversion processing program storage medium storing a color conversion processing program which causes an information processing apparatus to operate as a color conversion processing apparatus, the color conversion processing apparatus comprising:

a memory section that stores three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

a profile integration section that combines the three types of profiles to create a combined profile providing an association between the coordinates on the target color space and the coordinates in the area subjected to the restriction on the first printer color space; and a color conversion processing section that performs a color conversion processing in which image data for a target having color information represented by the coordinates on the target color space is converted into image data for a printer having color information represented by the coordinates in the area subjected to the restriction on the first printer color space in accordance with the combined profile.

To achieve the above-mentioned object, the present invention provides a color conversion processing program storage medium according to claim 4, wherein color conversion processing apparatus further comprises a profile designation section that designates a pair of a desired target profile and a desired printer profile, and wherein the profile integration section combines the target profile and the printer profile designated by the profile designation section with a printer processing conversion profile associated with the printer profile to create the combined profile.

In the present invention as mentioned above, it is acceptable that the first printer color space and the second printer color space are the same color spaces. Alternatively, it is acceptable that both the printer spaces depends on the printer but mutually different from one another, for example, in such a way that the first printer color space is RGB color space represented by three colors of R (red), G (green), and B (blue) and the second printer color space is CMYK color space.

According to the present invention, instead of the conventional printer conversion processing section as mentioned above, there are prepared the coordinates in the area subjected to the restriction on the printer color space, and the printer processing conversion profile associated with the coordinates on the printer color space in which the restriction is removed. And when the profiles are combined, the target profile and the printer profile are combined with the printer processing conversion profile so that the image data is converted in accordance with the combined profile thus obtained. Thus, even if it is concerned with the printer involving the restriction as mentioned above, it is possible to complete the conversion processing in the same time as the conversion based on the link profile in which the target profile is combined with the printer profile, and thereafter there is no need of the conversion processing time of the printer conversion processing section and thus it is possible to expect a high speed conversion processing. With respect to a method of creating a printer processing conversion profile per se, it is not restricted, and it is possible to create the printer processing conversion profile in accordance with an optional creating method based on the optional processing method. Accordingly, the processing method to be implemented in accordance with the printer processing conversion profile thus created can be flexibly altered by the replacement of the printer processing conversion profile.

Incidentally, specifying the printer profile for creating the combined profile makes it possible to specify the corresponding printer processing conversion profile. Accordingly, providing the above-mentioned profile designation to designate the target profile and the printer profile of interest makes it possible to create the combined profile through the same operation as the conventional operation without operator's consciousness of the existence of the printer processing conversion profile by means of specifying the printer processing conversion profile according to the specified printer profile to create the combined profile.

While the profile designation section designates the target profile and the printer profile, there is no need to individually those profiles. When the name is applied to the link profile in which the target profile is coupled with the printer profile, it is acceptable to designate the target profile and the printer profile constituting the link profile through designation of the link profile.

DETAILED DESCRIPTION OF PREFERRED EMBODIMENTS

Embodiments of the present invention will be described with reference to the accompanying drawings.

Figure 1:
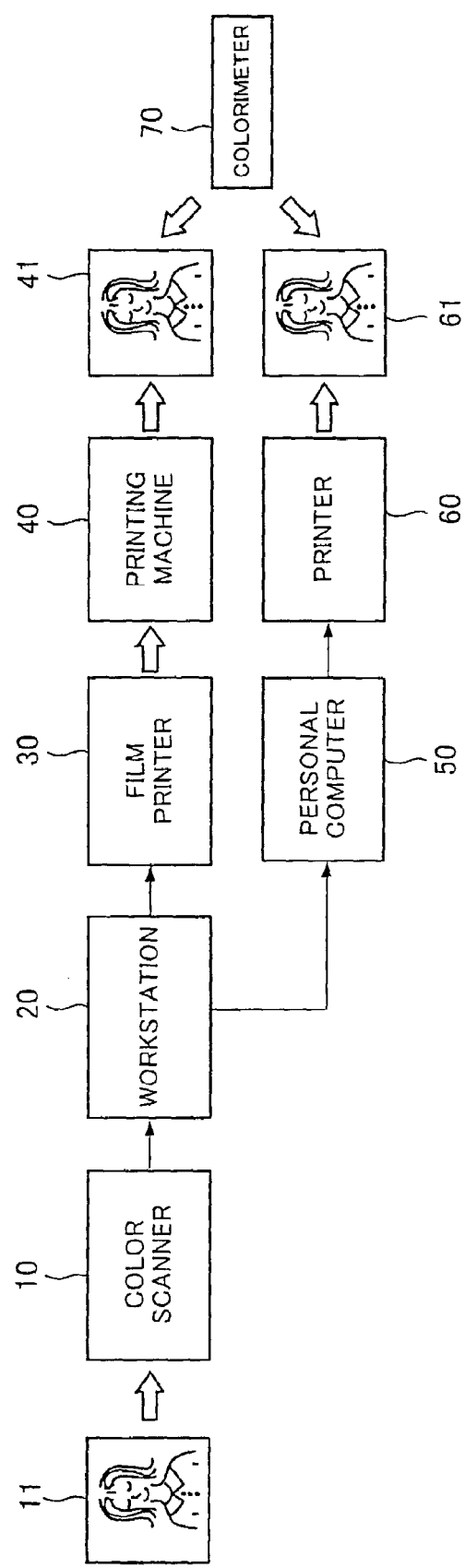
FIG. 1 is a construction view of a printing and proof image creating system to which an embodiment of the present invention is applied.

FIG. 1 is a construction view of a printing and proof image creating system to which an embodiment of the present invention is applied.

A color scanner 10 reads an original image 11 to generate color separation image data for four colors of C (cyan), M (magenta), Y (yellow), K (black) representative of the original image 11. The color separation image data for CMYK is fed to a workstation 20. In the workstation 20, an operator performs an electronic page make-up in accordance with fed image data to generate image data representative of an image for printing. The image data for printing is fed to a film printer 30 when the printing is performed. The film printer 30 creates film original plates for printing for CMYK in accordance with the fed image data.

From the film original plates for printing, machine plates are created, and the machine plates thus created are loaded onto a printing machine 40. Ink is applied to the machine plates loaded onto the printing machine 40. The applied ink is transferred to a paper for printing to form a printed image 41 on the paper.

A series of work that the film printer 30 is used to create the film original plates, a machine plate is created and is loaded onto the printing machine 40, and ink is applied to the machine plate to perform a printing on a sheet, is a large-scale work, and it costs a great deal. For this reason, prior to the actual printing work, a printer 60 is used to create a proof image 61 in accordance with a manner as set forth below, so that finish of the printed image 41 is confirmed beforehand.

When the proof image 61 is created, the image data, which is created by the electronic page make-up on the workstation 20, is fed to a personal computer 50. Here, the image data fed to the personal computer 50 is description language data described in a so-called PDL (Page Description Language). In the personal computer 50, a so-called RIP (Raster Image Processor) is used to convert the received image data into image data for CMYK four colors developed into a bit map. The image data for CMYK four colors is substantially same as the image data for printing fed to the film printer 30.

The image data for CMYK four colors for printing is converted into image data for CMYK four colors suitable for the printer 60, while the profile is referred to in the personal computer 50. The printer 60 receives the image data for CMYK four colors for the printer to create a proof image 61 in accordance with the received image data for CMYK four colors for the printer.

According to the printer 60, while it is permitted that the respective image data for CMYK takes values of 0% to 100% in dot % for each pixel, an image is printed out in accordance with image data in which a value integrating values of image data for CMYK on one pixel is not more than 200%.

A calorimeter 70 shown in FIG. 1 will be described later.

Figure 2:
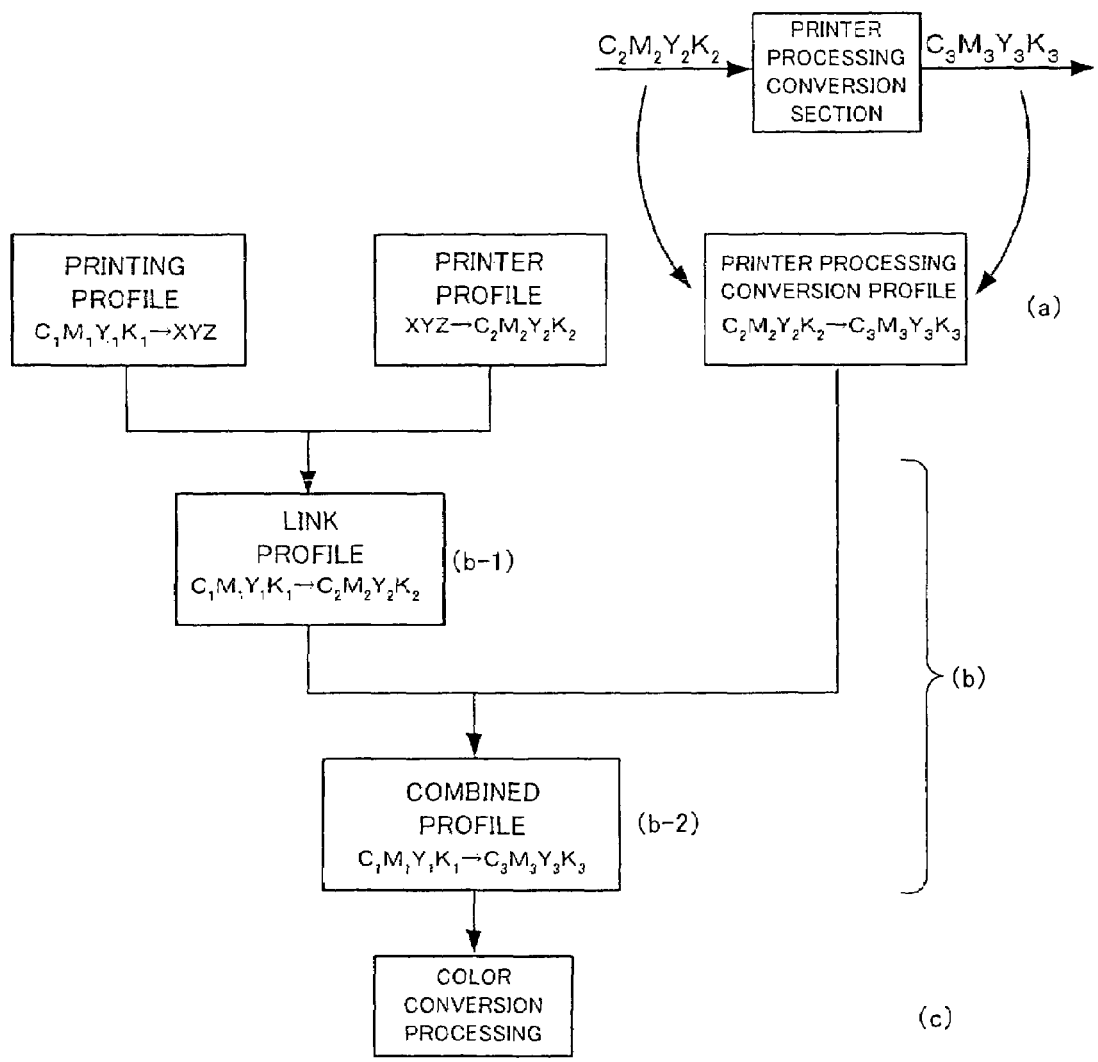
FIG. 2 is a flowchart useful for understanding an embodiment of a color conversion processing method of the present invention.

FIG. 2 is a flowchart useful for understanding an embodiment of a color conversion processing method of the present invention.

First, in a step (a), there are prepared three types of profiles of a printing profile, a printer profile and a printer conversion processing profile. Hereinafter, there will be explained those three types of profiles.

First, there will be explained the printing profile.

The workstation 20 shown in FIG. 1 creates dot % data for CMYK four colors wherein the dot % data is sequentially varied for example as 0%, 10%, ..., 100%, and creates color charts based on the dot % data thus created in accordance with the above-mentioned printing procedure. While the image 41 shown in FIG. 1 is not an image representative of a color chart, it is assumed that instead of the image 41 a color chart, wherein a large number of color patches is arranged, is printed. The calorimeter 70 measures the respective color patches constituting the color chart to determine the respective color patch XYZ values (coordinate values on XYZ color spaces). Thus, it is possible to construct a printing profile representative of an association between the coordinate values on the color spaces for CMYK four colors and the coordinate values on the common color spaces (here XYZ color spaces).

Figure 3:
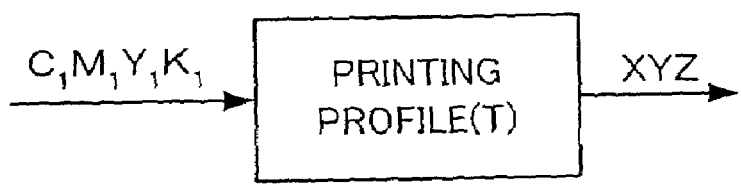
FIG. 3 is a conceptual view of a printing profile.

FIG. 3 is a conceptual view of a printing profile.

The printing profile shown in FIG. 3 receives image data defined by CMYK to convert the received image data for CMYK into image data defined by XYZ values. Here, the image data defined by CMYK is represented by $C_1 M_1 Y_1 K_1$.

Next, there will be explained a printer profile.

A method of creating the printer profile is the same as a method of creating the printing profile excepting that an output device for outputting a color chart is a printer but not a printing machine. That is, here, the personal computer 50 shown in FIG. 1 is used to generate dot % data for CMYK four colors, sequentially varied, for example, at intervals of 0%, 10%, ..., 100% (here, it is denoted by $C_2 M_2 Y_2 K_2$). The dot % data thus generated is transmitted to the printer conversion processing section as shown in FIG. 2. The printer 60 prints out an image in accordance with image data, which is represented by values of 0% to 100% in dot % for CMYK, wherein a value integrating values of image data for CMYK on one pixel is not more than 200%. The printer conversion processing section receives image data having values of 0% to 100% in dot % for CMYK without limitation and converts such image data into image data with restriction that a value integrating values of image data for CMYK on one pixel is not more than 200%.

With respect to the conversion algorithm in the printer conversion processing section, various types of algorithms can be used. And thus the conversion algorithm is not restricted. According to the present embodiment, there are adopted processing in which the minimum values of the values of C, M, Y, are subtracted from the values of C, M, Y, and the value of K is increased by the corresponding subtraction, and/or a complicated gamut conversion processing.

As the printer conversion processing section, it is acceptable to adopt one in which an arithmetic operation is performed with hardware or software. Alternatively, in the event that the printer conversion processing profile is first created, it is acceptable that the printer conversion processing profile is used.

To create a printer profile, the personal computer 50 shown in FIG. 1 is used to create dot % data of $C_2M_2Y_2K_2$ in which the dot % data are sequentially varied on each color, 0%, 10%, . . . , 100%, and the dot % data thus created is transferred to the printer conversion processing section so that the printer conversion processing section converts the dot % data into dot % data of CMYK restricted to 200% (this CMYK is denoted as $C_3M_3Y_3K_3$), and the dot % data consisting of four colors of $C_3M_3Y_3K_3$ thus obtained is transferred to the printer 60 so that prints out a color chart in accordance with the dot % data. While the image 61 shown in FIG. 1 is not an image representative of a color chart, it is assumed that the printer 60 outputs a color chart, which is the same type as the color chart created by printing of the printing machine 40, instead of the image 61. The calorimeter 70 measures the respective color patches constituting the color chart to determine the respective color patch XYZ values (coordinate values on XYZ color spaces). Thus, it is possible to construct a printer profile representative of an association between the coordinate values on the color spaces for $C_2M_2Y_2K_2$ four colors and the coordinate values on the common color spaces (here XYZ color spaces), on the printer 60.

Figure 4:
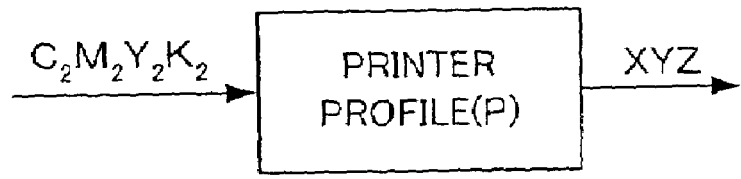
FIG. 4 is a conceptual view of a printer profile.

FIG. 4 is a conceptual view of a printer profile.

The printer profile shown in FIG. 4 receives dot % data for $C_2M_2Y_2K_2$ to convert the received dot % data for $C_2M_2Y_2K_2$ into colorimetric data for XYZ. Here, the printer profile for converting the dot % data for $C_2M_2Y_2K_2$ into the colorimetric data for xyz is denoted by P, and reversely, a printer profile for converting the colorimetric data for XYZ into the dot % data for $C_2M_2Y_2K_2$ is denoted by $P^{-1}$.

While it is explained that the printer 60 outputs an image in accordance with the dot % data for CMYK, also with respect to a printer for outputting an image according to data for RGB for instance, it is likely possible to create a printer profile suitable for the printer in such a manner that the personal computer 50 is used to generate data defined with an RGB space, and outputs a color chart.

Here, however, there will be explained the present embodiment wherein there is used the printer 60 for outputting an image in accordance with the dot % data for CMYK.

Next, there will be explained the printer processing conversion profile.

The printer processing conversion profile provides an association between arbitrarily dot % data for $C_2M_2Y_2K_2$ and the restricted dot % data for $C_3M_3Y_3K_3$. There will be explained an example of a creating procedure of the printer processing conversion profile, hereinafter.

Figure 5:
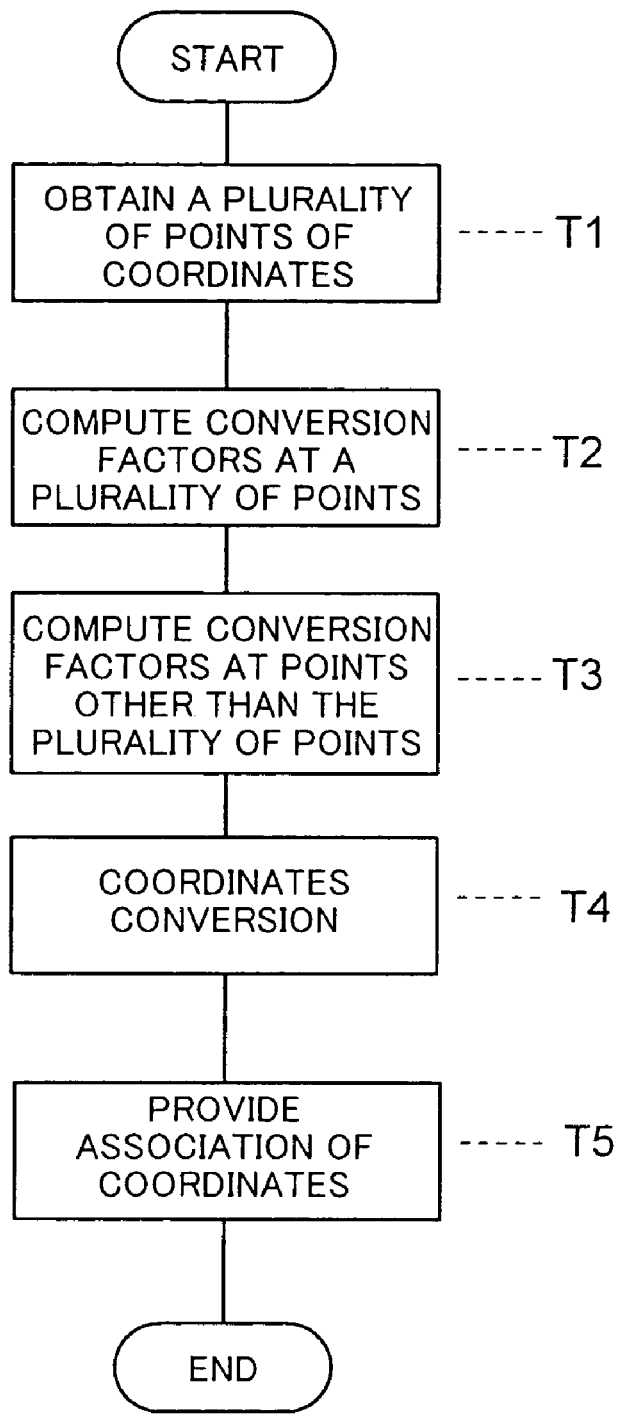
FIG. 5 is a flowchart useful for understanding a creating procedure of a printer processing conversion profile.

FIG. 5 is a flowchart useful for understanding a creating procedure of a printer processing conversion profile.

In a step T1 of FIG. 5, there is created dot % data for a series of printer color spaces (CMYK color spaces) for creating the printer processing conversion profile to obtain a plurality of points of coordinates in the printer color spaces. First, with respect to dot % data for K-plates, there are set up dot % data sequentially varied for example, 0%, 10%, . . . , 100%, and there are determined cubic CMYK color spaces wherein CMY three colors are variables, and in which K-plates are fixed on the series of dot % data thus set up. Set of the CMY color spaces thus determined is equivalent to the printer color space.

Figure 6:
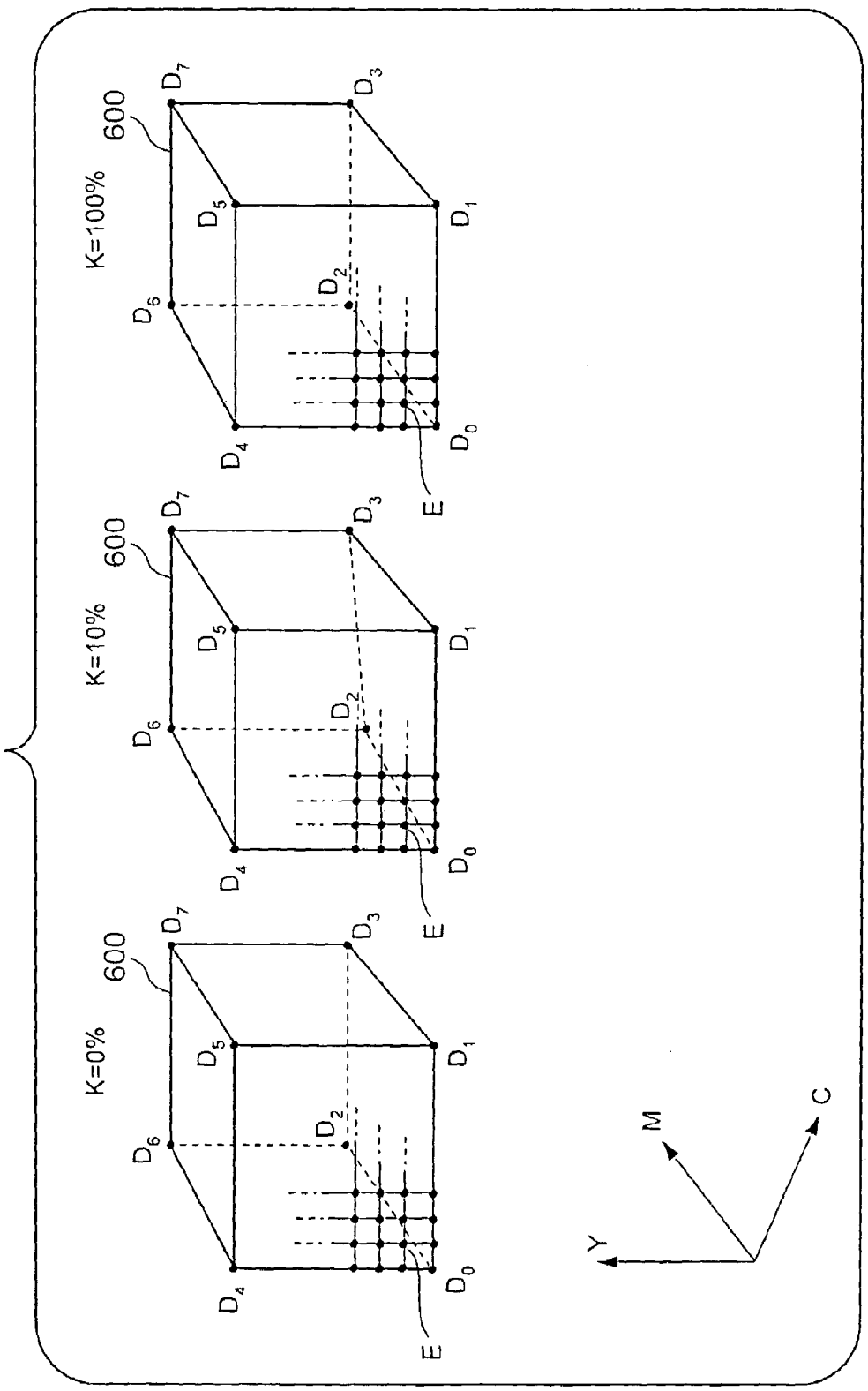
FIG. 6 is a series of color spaces in which K-plates are fixed on a series of dot % data, respectively.

FIG. 6 is a series of color spaces in which K-plates are fixed on a series of dot % data, respectively.

FIG. 6 shows cubic CMYK color spaces 600 wherein dot % data of K-plates are fixed on a series of dot % data such as 0%, 10%, . . . , 100%. FIG. 6 further shows lattice points E that are arranged as a lattice on the CMYK color spaces 600. According to the present embodiment, as a plurality of points of coordinates, there are obtained coordinates of eight vertexes $D_j$ (j=0, 1, . . . 7) in CMY color spaces where dot % data of K-plate is $K_i$ (i=0, 10, . . . 100).

Next, in a step T2 of FIG. 5, there are computed conversion factors for converting image data defined by a plurality of points of coordinates thus obtained into restricted image data.

In order to compute the conversion factors, first, there are obtained coordinates ($C_{Di}$, $M_{Di}$, $Y_{Di}$, $K_i$) of the vertexes $D_i$ in the CMYK color spaces 600 of FIG. 6. Total amount $\text{Ink}_{i\_j}$ of ink at the vertexes $D_i$ is computed in accordance with the following equation.

$$\text{Total amount Ink}_{i\_j} \text{ of ink} = C_{Di} + M_{Di} + Y_{Di} + K_i$$

Further, conversion factors $R_{ij}$, wherein the total amount $\text{Ink}_{i\_j}$ of ink is reduced to the value equal to or less than the restricted amount S, are computed in accordance with the following equation.

$$\text{Conversion factors } R_{ij} = (S - Ki)/\text{Ink}_{i\_j}$$

In a step T3 of FIG. 5, there are computed conversion factors at coordinates ($C_{any}$, $M_{any}$, $Y_{any}$, $K_i$) (any: lattice points E other than vertexes $D_i$) of lattice points E other than vertexes $D_i$ of the lattice points E on the CMYK color spaces 600. According to the present embodiment, in order to compute the conversion factors, there is adopted a four point interpolation system in which of eight vertexes $D_i$ in the color space 600 four points enclosing the lattice point E are selected to perform a weighting. Hereinafter, there will be explained a procedure of computing the conversion factors in accordance with the four point interpolation system.

First, in view of a size relation of coordinates components among coordinates ($C_{any}$, $M_{any}$, $Y_{any}$, $K_i$) of each lattice point E, four points to be subjected to weighting is selected from among eight vertexes $D_i$. For example, if the coordinates components of the lattice point E are expressed by $Y_{any} < M_{any} < C_{any}$, points $D_1$ and $D_3$ are selected in addition to points $D_0$ and $D_7$, and the interpolation computation is performed using four conversion factors as set forth below.

$R'_0 = R_{i\_0}$ $R'_7 = R_{i\_7}$ $R'_a = R_{i\_1}$ $R'_b = R_{i\_3}$

Since the coordinates components of the lattice point E are expressed by $Y_{any} < M_{any} < C_{any}$, the following replacement is established.

$V_L = C_{any}$ $V_M = M_{any}$ $V_S = Y_{any}$

And weighting factors for interpolating computing are set up as follows.

$K_0 = 1 - V_L$ $K_7 = V_S$ i $K_a = V_L - V_M$ $K_b = V_M - V_S$

Then, the conversion factor $R_{i\_any}$ in the lattice point E is computed in accordance with the interpolation formula as set forth below.

Conversion factor $R_{i\_any} = K_0 \cdot R'_0 + K_7 \cdot R'_7 + K_a \cdot R'_a + K_b \cdot R'_b$ Likewise, if the coordinates components of the lattice point E are expressed by $M_{any} < Y_{any} < C_{any}$, points $D_1$ and $D_5$ are selected in addition to points $D_0$ and $D_7$, and there are obtained the values as set forth below.

$R'_a = R_{i\_1}$ $R'_b = R_{i\_5}$ $V_L = C_{any}$ $V_M = Y_{any}$ $V_S = M_{any}$ If the coordinates components of the lattice point E are expressed by $Y_{any} < C_{any} < M_{any}$, points $D_2$ and $D_3$ are selected in addition to points $D_0$ and $D_7$, and there are obtained the values as set forth below.

$R'_a = R_{i\_2}$ $R'_b = R_{i\_3}$ $V_L = M_{any}$ $V_M = C_{any}$ $V_S = Y_{any}$ If the coordinates components of the lattice point E are expressed by $C_{any} < Y_{any} < M_{any}$, points $D_2$ and $D_6$ are selected in addition to points $D_0$ and $D_7$, and there are obtained the values as set forth below.

$R'_a = R_{i\_2}$ $R'_b = R_{i\_6}$ $V_L = M_{any}$ $V_M = Y_{any}$ $V_S = C_{any}$ If the coordinates components of the lattice point E are expressed by $M_{any} < C_{any} < Y_{any}$, points $D_4$ and $D_5$ are selected in addition to points $D_0$ and $D_7$, and there are obtained the values as set forth below.

$R'_a = R_{i\_4}$ $R'_b = R_{i\_5}$ $V_L = Y_{any}$ $V_M = C_{any}$ $V_S = M_{any}$ If the coordinates components of the lattice point E are expressed by $C_{any} < M_{any} < Y_{any}$, points $D_4$ and $D_6$ are selected in addition to points $D_0$ and $D_7$, and there are obtained the values as set forth below.

$R'_a = R_{i\_4}$ $R'_b = R_{i\_6}$ $V_L = Y_{any}$ $V_M = M_{any}$ $V_S = C_{any}$ Then, those values are substituted for a formula for computing the conversion factor $R_{i\_any}$ to determine the conversion factor. According to the present embodiment, there is adopted the four point interpolation system in which of eight vertexes four points enclosing the lattice point E are selected to perform a weighting. However, with respect to the conversion factor of the lattice point E, it is acceptable to adopt a six point interpolation system and an eight point interpolation system. Further, it is acceptable that the conversion factor is estimated in accordance with a method other than the interpolation.

When the conversion factors in the entire lattice points E including vertexes $D_i$ in the CMYK color spaces 600 shown in FIG. 6 are computed, the process goes to a step T4 in which coordinates of the entire lattice points E are converted into the restricted coordinates. According to the present embodiment, an amount of inks is restricted without reducing the K-plate. The restricted coordinates (C', M', Y' K'), wherein the coordinates of the lattice points E are converted, are computed in accordance with the equations as set forth below.

$C' = R \times C$ $M' = R \times M$ $Y' = R \times Y$ $K' = K$

Where the coordinates of the lattice points E are expressed by (C, M, Y, K), and the conversion factor on the lattice point E is expressed by R.

Further, in a step T5 of FIG. 5, there is provided an association between the coordinates (C, M, Y, K), that is, the dot % data of $C_2M_2Y_2K_2$, and the restricted coordinates (C', M', Y' K'), that is, the dot % data of $C_3M_3Y_3K_3$, so that a printer processing conversion profile is created.

Figure 7:
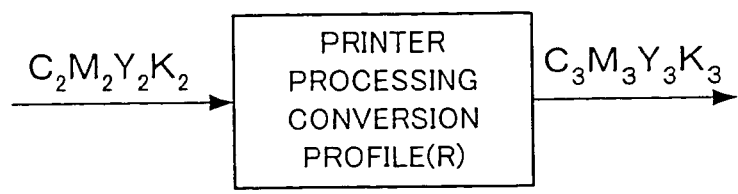
FIG. 7 is a conceptual view of a printer processing conversion profile.

FIG. 7 is a conceptual view of a printer processing conversion profile.

The printer processing conversion profile (R) provides an association between data of $C_2M_2Y_2K_2$ before the arithmetic processing by the printer conversion processing section for applying restriction to image data by arithmetic operation by the hardware or the software, which is usually used, and data of $C_3M_3Y_3K_3$ after the arithmetic processing, in format of a LUT (Look Up Table). Creation of the printer processing conversion profile in format of a LUT makes it possible to combine profiles including the printer processing conversion profile and thereby implementing a high-speed arithmetic operation.

In the step (a) of FIG. 2, in the manner as mentioned above, there are prepared three sorts of profiles such as the printing profile, the printer profile and the printer processing conversion profile.

Incidentally, it is not restricted that the printing profile, the printer profile and the printer processing conversion profile are prepared always by single. It is acceptable that for example, the printing profile is created for each different printing condition such as difference of ink and difference of printing paper, even if it is concerned with the same printing machine, of course if it is concerned with the different printing machine.

Likely, it is acceptable that the printer profile is also created for each different printing condition such as difference of printing paper, even if it is concerned with the same printer, of course if it is concerned with the different printer.

The printer processing conversion profile is determined in accordance with the printer profile if it is determined. However, it happens that the same printer processing conversion profile is used even if it is concerned with a different printer profile, for example, such a case where the same printer processing conversion profile is used as to a plurality of sorts of printer profiles in a case that it is concerned with the same printer and printing papers are different from one another.

Next, there will be explained a step (b) of FIG. 2.

The step (b) of FIG. 2 is a step of a profile combination in which first the printing profile is combined with the printer profile to create a link profile (step b-1), and then the link profile is combined with the printer processing conversion profile to create a combined profile (step b-2).

Figure 8:
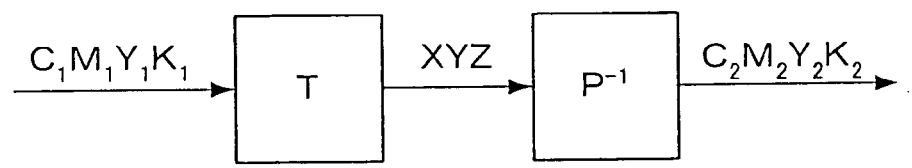
FIG. 8 is a view of a link profile in which the printing profile is combined with the printer profile.

FIG. 8 is a view of a link profile in which the printing profile is combined with the printer profile.

Dot % data of $C_1M_1Y_1K_1$ for printing is converted into colorimetric data of XYZ through the printing profile T, and then the colorimetric data of XYZ is converted into dot % data of $C_2M_2Y_2K_2$ for printer through the printer profile $P^{-1}$. The link profile, which consists of the printing profile T and the printer profile $P^{-1}$, is a profile in which image data defined by $C_1M_1Y_1K_1$ color space for printing is converted into image data defined by $C_2M_2Y_2K_2$ color space for printer.

Figure 9:
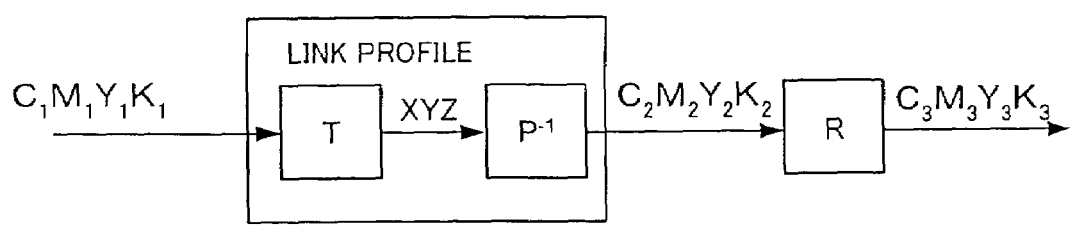
FIG. 9 is a combined profile in which the link profile is combined with the printer processing conversion profile.
Figure 10:
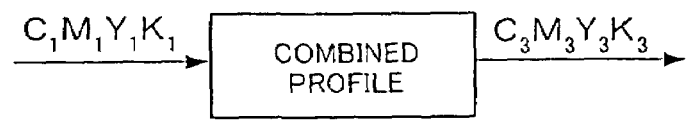
FIG. 10 is a view showing the combined profile with one block.

FIG. 9 is a combined profile in which the link profile is combined with the printer processing conversion profile. FIG. 10 is a view showing the combined profile with one block.

The link profile for converting the dot % data of $C_1M_1Y_1K_1$ for printing into the dot % data of $C_2M_2Y_2K_2$ for printer is combine with the printer processing conversion profile R for converting the dot % data of $C_2M_2Y_2K_2$ into dot % data of $C_3M_3Y_3K_3$ in which the maximum value is restricted to for example 200%, so that there is created a combined profile in format of one LUT, as shown in FIG. 10, for directly converting dot % data of $C_1M_1Y_1K_1$ or printing into dot % data of $C_3M_3Y_3K_3$ for printer having the restricted value (the step b-2).

In a step (c) of FIG. 2, the combined profile thus created is used to convert image data represented by dot % of $C_1M_1Y_1K_1$ for printing into image data represented by dot % of $C_3M_3Y_3K_3$ for printer, with respect to image data representative of the actual image, but not the color chart.

The printer 60 shown in FIG. 1 receives the image data represented by dot % of $C_3M_3Y_3K_3$ for printer thus obtained and prints out a proof image in accordance with the received image data.

Next, there will be explained an example of a creating procedure different from the creating procedure of the above-mentioned printer conversion processing profile. The creating procedure, which will be explained here, is a creating procedure assuming that there is used a K-plate preservation type of link profile in which a printing profile is combined with a printer profile so that the K-component of the dot % of $C_1M_1Y_1K_1$ for printing is maintained in form of the K-component of the dot % of $C_2M_2Y_2K_2$ for printer, instead of the link profile in which the printing profile is simply combined with the printer profile in the manner as mentioned above. This creating procedure also supposes that both the printing and the printer use dot % data for CMYK of the same format.

Figure 11:
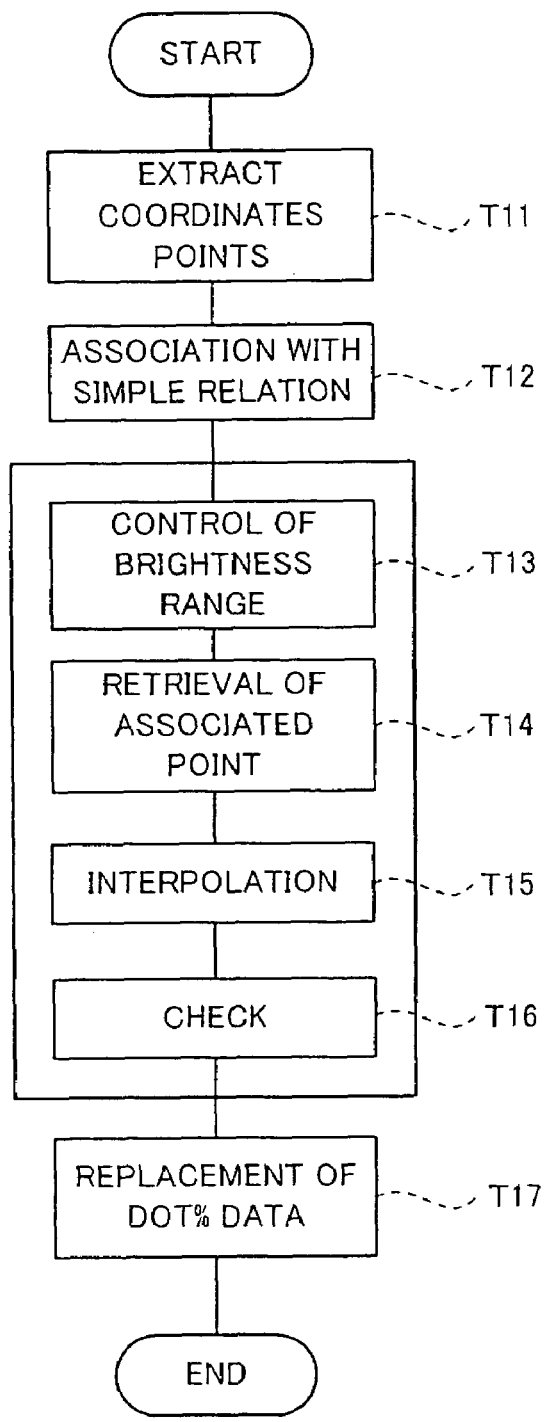
FIG. 11 is a flowchart useful for understanding another creating procedure of a printer processing conversion profile.

FIG. 11 is a flowchart useful for understanding another creating procedure of a printer processing conversion profile.

According to the creating procedure shown in FIG. 11, first, in a step T11, with respect to $C_1M_1Y_1K_1$ space for printing and $C_2M_2Y_2K_2$ space for printer, extracted are coordinates points on the respective axes defined as (0,0,0,K), (0,0,100,K), (0,100,0,K), (0,100,100,K), (100,0,0,K), (100,0,100,K), (100,100,0,K), (100,100,100,K), where K is 0 to 100%. Referring to FIG. 6, those axes correspond to axes coupling vertexes (for example, vertexes $D_5$) which are denoted by the same reference numbers in the respective CMYK space 600.

Next, in a step T12, with respect to the printer coordinates points (Cp, Mp, Ywp, Kp) extracted from $C_2M_2Y_2K_2$ space for printer, restricted coordinates points (Cp', Mp', Ywp', Kp') restricted in the total amount are determined to provide an association. The total amount is represented by the following simple relation, where the total amount restriction maximum value is "LIMIT". If Cp+Mp+Ywp+Kp<=LIMIT, Cp'=Cp,Mp'=Mp,Ywp'=Ywp,Kp'=Kp If *Cp+Mp+Ywp+Kp*>LIMIT,

*Cp'=Cpx*(LIMIT*-Kp*)/(*Cp+Mp+Ywp*)

*Mp'=Mpx*(LIMIT*-Kp*)/(*Cp+Mp+Ywp*)

*Ywp'=Ywpx*(LIMIT*-Kp*)/(*Cp+Mp+Ywp*)

Kp'=Kp

The restricted coordinates points (Cp', Mp', Ywp', Kp') thus determined are coordinates points of $C_2M_2Y_2K_2$ space for printer, and accordingly are associated with XYZ values by the printer profile P shown in FIG. 4. On the other hand, printing coordinates points (Ct, Mt, Ywt, Kt) extracted from $C_1M_1Y_1K_1$ space for printing in the step T11 are associated with XYZ values by the printing profile T shown in FIG. 3. Since those XYZ values can be replaced by coordinates values (Lab values) of the Lab color space in accordance with a predetermined conversion relation, it would happen that the XYZ values and the Lab values are used without distinction therebetween.

Figure 12:
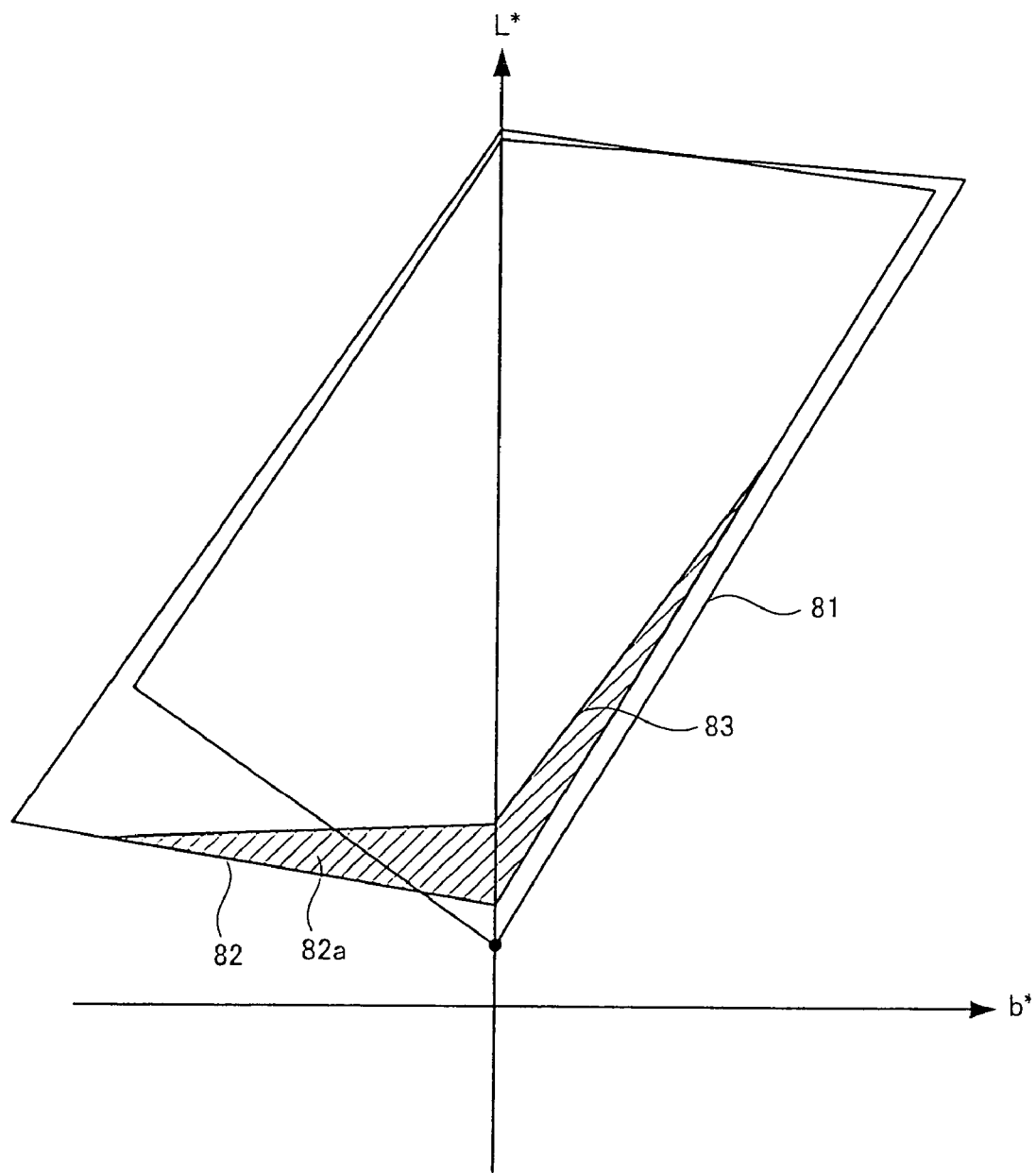
FIG. 12 is a conceptual view useful for understanding an association between restricted coordinates points and printing coordinates points and Lab values.

FIG. 12 is a conceptual view useful for understanding an association between restricted coordinates points and printing coordinates points and Lab values.

FIG. 12 represents a Lab space on a two-dimensional basis wherein the horizontal axis of the figure denotes b* direction and the vertical direction denotes L* direction. FIG. 12 typically shows an area 81 for Lab values associated with the printing coordinates points (Ct, Mt, Ywt, Kt) where Kt is fixed on a certain value, an area 82 for Lab values associated with the printer coordinates points (Cp, Mp, Ywp, Kp) where Kp is fixed on a certain value, and an area 83 for Lab values associated with the restricted coordinates points (Cp', Mp', Ywp', Kp') restricted in the total amount for the printer coordinates points (Cp, Mp, Ywp, Kp). Those areas 81, 82 and 83 represent ranges of colors capable of being represented by printing and printers, in the event that the associated printing coordinates points, printer coordinates points and restricted coordinates points are used as dot % data. The area 83 for Lab values associated with the restricted coordinates points (Cp', Mp', Ywp', Kp') is subjected to the restriction of the total amount, and accordingly, as compared with the area 82 for Lab values associated with the printer coordinates points (Cp, Mp, Ywp, Kp), the area 83 is smaller by an area portion 82a shown with slashed lines.

In the step T13 to T16 in FIG. 11, the printing coordinates points (Ct, Mt, Ywt, Kt) and the restricted coordinates points (Cp', Mp', Ywp', Kp'), which are associated with the areas of the Lab values mutually different from one another, are associated with each other through such a modification that the area associated with the printing coordinates points is superposed upon the area associated with the restricted coordinates points.

In a step T13, there is performed a modification of an area of the color reproduction to meet the brightness range.

Figure 13:
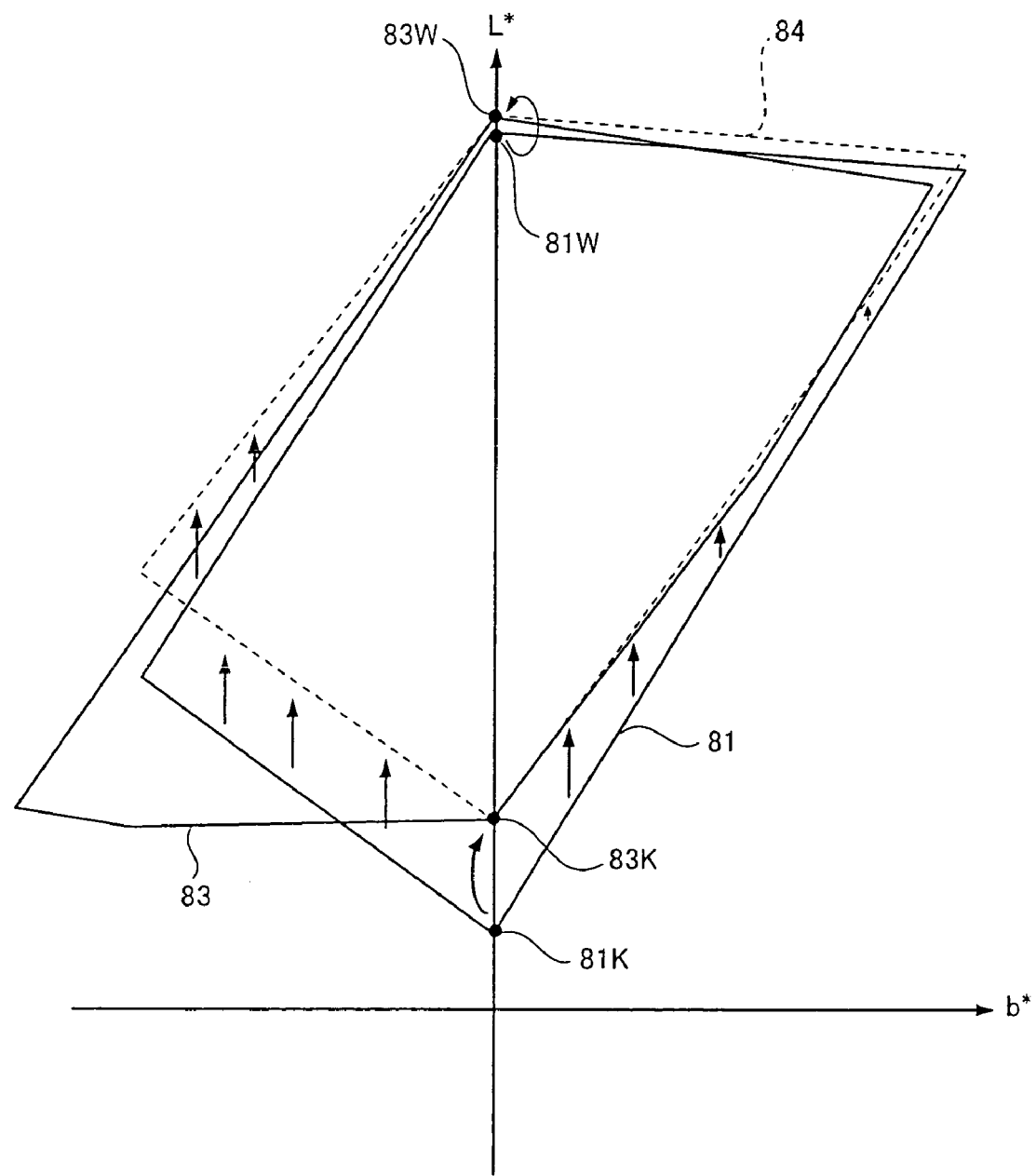
FIG. 13 is a conceptual view useful for understanding the conversion in the step T13 in FIG. 11.

FIG. 13 is a conceptual view useful for understanding the conversion in the step T13 in FIG. 11.

FIG. 13 also represents a Lab space on a two-dimensional basis wherein the horizontal axis of the figure denotes b* direction and the vertical direction denotes L* direction. FIG. 13 shows the area 81 for Lab values associated with the printing coordinates points (Ct, Mt, Ywt, Kt), and the area 83 for Lab values associated with the restricted coordinates points (Cp', Mp', Ywp', Kp'), which are also shown in FIG. 12.

According to the conversion in the step T13 in FIG. 11, the area 81 associated with the printing coordinates points is modified to a modified area 84 in such a manner that a black point 81K and a white point 81W in the area 81 associated with the printing coordinates points approximate a black point 83K and a white point 83W in the area 83 associated with the restricted coordinates points.

More strictly, XYZ values are converted in such a manner that Y values at white points (Ct, Mt, Ywt, Kt)=(0, 0, 0, 0) and black points (Ct, Mt, Ywt, Kt)=(100, 100, 100, 0) of a printing system are coincident with Y values $Yp_0'$ and $Yp_{100}'$ at the restricted coordinates points ($Cp_0'$, $Mp_0'$, $Ywp_0'$, $Kp_0'$) and ($Cp_{100}'$, $Mp_{100}'$, $Ywp_{100}'$, $Kp_{100}'$) associated with white points (Cp, Mp, Ywp, Kp)=(0, 0, 0, 0) and black points (Cp, Mp, Ywp, Kp)=(100, 100, 100, 100) of a printer system, respectively. Y value Yt' after conversion is determined the formula as set forth below.

$$Yt' = \{(Yp_{100}' - Yp_0')/(Yt_{100} - Yt_0)\} \times (Yt - Yt_0) + Yp_0'$$

where $Yt_0$ and $Yt_{100}$ are Y values before conversion at white points and black points of a printing system.

At that time, X value and Y value are converted in such a manner that a-value component and b-value component in the Lab space are saved.

Such a range conversion is executed on XYZ values at the coordinates points extracted from the $C_1M_1Y_1K_1$ space for printing in the step T11.

Next, in a step T14 of FIG. 11, the restricted coordinates points to be associated with the coordinate points extracted from the $C_1M_1Y_1K_1$ space for printing in the step T11 is retrieved using a relation between the modified area obtained in the step T13 and an area of the Lab value associated with the restricted coordinates points.

Figure 14:
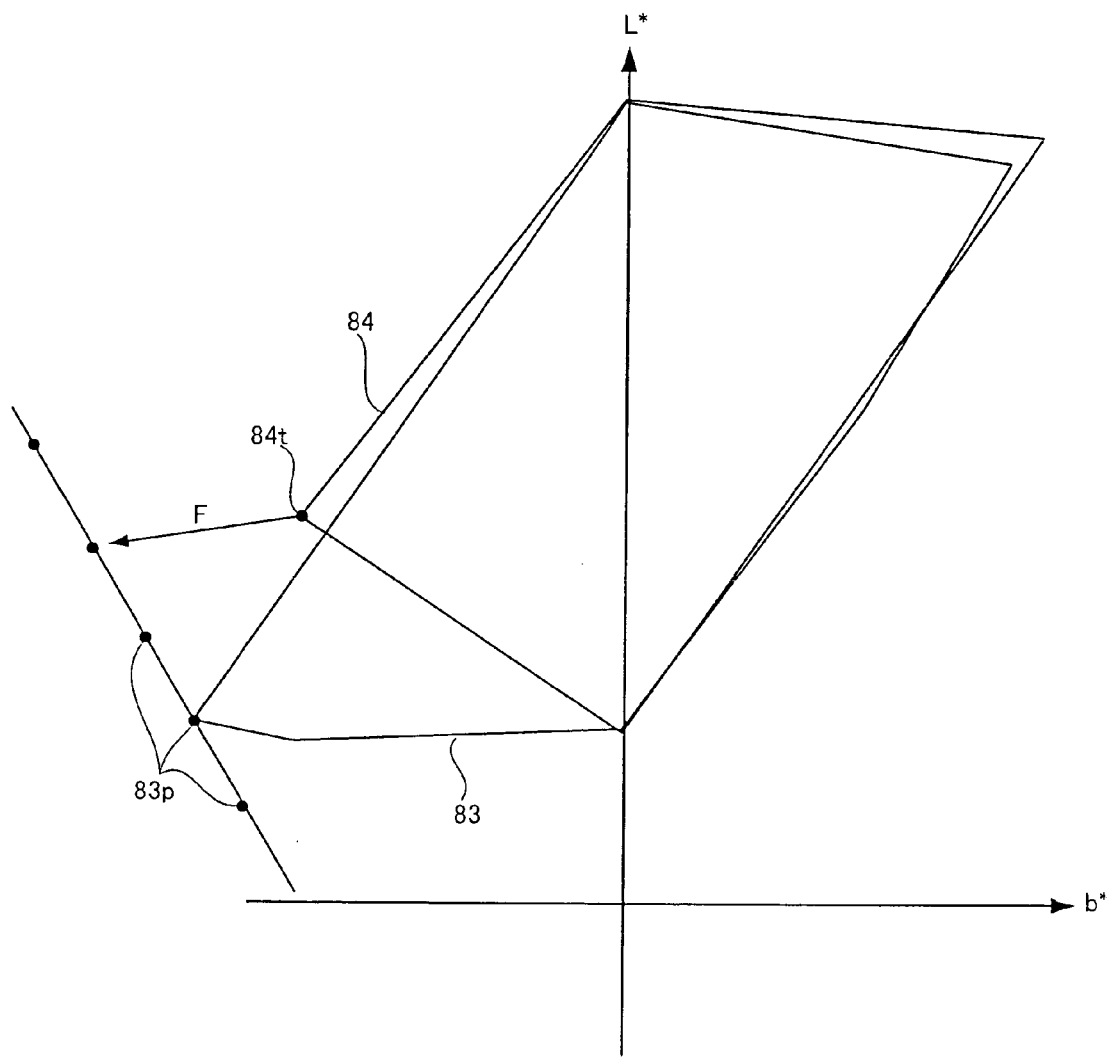
FIG. 14 is a conceptual view useful for understanding the retrieval in the step T14 in FIG. 11.

FIG. 14 is a conceptual view useful for understanding the retrieval in the step T14 in FIG. 11.

FIG. 14 also represents a Lab space on a two-dimensional basis wherein the horizontal axis of the figure denotes b* direction and the vertical direction denotes L* direction. FIG. 14 shows the area 83 for Lab values associated with the restricted coordinates points (Cp', Mp', Ywp', Kp'), and the modified area 84, which are also shown in FIG. 13.

FIG. 14 also shows coordinates point 84t in the modified area 84, which is associated with the coordinates point (here by way of example (100, 100, 0, Kt) where Kt is constant) extracted from the $C_1M_1Y_1K_1$ space for printing in the step T11, and coordinates points 83p representative of a series of Lab values associated with a series of restricted coordinates points ($Cp_{100}'$, $Mp_{100}'$, $Ywp_0'$, Kp') which are restricted in total amount for a series of printer coordinates points (100, 100, 0, Kp) (where Kp is a series of values) in which CMYK values are saved for the coordinates point (100, 100, 0, Kt).

In a step T14 of FIG. 11, from among the coordinates points 83p representative of a series of Lab values, there is retrieved the coordinates point 83p in which its Y-value is closest to the Y-value of the coordinates point 84t in the modified area 84. Closing in the Y-value means closing in the L-value, and thus as shown by an arrow F of FIG. 14, there is determined the associated coordinates point 83p. And the restricted coordinates points ($Cp_{100}'$, $Mp_{100}'$, $Ywp_0'$, Kp') associated with the coordinates point 83p thus retrieved are associated with the printing coordinates point (100, 100, 0, Kt) selected as the retrieval source. According to this retrieval and the association, extent of the modified area 84 in an a-value direction and a b-value direction is substantially close to extent of the area 83 associated with the restricted coordinates points.

This retrieval and the association are executed on the respective coordinates points extracted from the $C_1M_1Y_1K_1$ space for printing in the step T11. As a result, when it is assumed that a series of CMY spaces 600 shown in FIG. 6 is a CMY space for a printing system, there are obtained the restricted coordinates points associated with the vertexes $D_0$ to $D_7$ of the CMY spaces 600 shown in FIG. 6.

Next, in a step T15 of FIG. 11, the coordinate values of the restricted coordinates points associated with the vertexes $D_0$ to $D_7$ are used to perform a volume interpolation as mentioned above, so that there are determined the restricted coordinates points associated with the printing coordinates points other than the vertexes. In a step T16 of FIG. 11, it is checked whether the restricted coordinates points thus determined by the interpolation satisfy the above-mentioned total amount restriction. In the event that a coordinates point exceeding the total amount restriction exist, the total amount restriction is applied in accordance with the relation for the total amount restriction as mentioned above.

In this manner, an execution of the step T13 to the step T16 of FIG. 11 makes it possible to obtain the association between the printing coordinates points (Ct, Mt, Ywt, Kt)

and the restricted coordinates points (Cp', Mp', Ywp', Kp'). However, the process of the association involves the modification of the area in the step T13 and the conversion of extent of the modified area in an a-value direction and a b-value direction in the step T14. Thus, a shade of meaning of the coordinates value of the CMYK color space of the printing system is very thin, and as to the CMY component, a shade of meaning of the coordinates value of the CMYK color space of the printer system is rather strong rather. Thus remains as the printing system appear only on the K-component.

On the other hand, the creating procedure of the printer processing conversion profile as mentioned above supposes that a K-plate saving type of link profile is used. The K-component of dot % data for a printer obtained by the link profile is one in which the K-component of dot % data $C_1M_1Y_1K_1$ for printing.

The association obtained through the step T13 to the step T16 is related to the link profile in the manner as mentioned above. And thus in a step T17, the association obtained through the step T13 to the step T16 is replaced by a printer processing conversion profile representative of the association between the print coordinates points (Cp, Mp, Ywp, Kp) and the restricted coordinates points (Cp', Mp', Ywp', Kp'). Thus, it is possible to obtain a printer processing conversion profile capable of canceling an affect due to K-plate saving in the link profile.

If it is intended that contents of the conversion implemented by the printer processing conversion profile thus obtained is directly implemented in accordance with the conversion formulas used in the above-mentioned creating procedure without any profile, it requires an extremely complicate operating processing, and also it is very difficult to change the conversion method. To the contrary, an adoption of a system using the printer processing conversion profile makes it possible to implement a simplification of the arithmetic processing and also to perform a flexible alternation of the conversion method.

Next, there will be explained embodiments of a color conversion processing apparatus of the present invention and a color conversion processing program storage medium of the present invention.

An aspect of a color conversion processing apparatus of the present invention and a color conversion processing program storage medium of the present invention as embodiments resides in processing contents to be executed by the personal computer 50 shown in FIG. 1. Hereinafter, there will be explained the personal computer 50.

Figure 15:
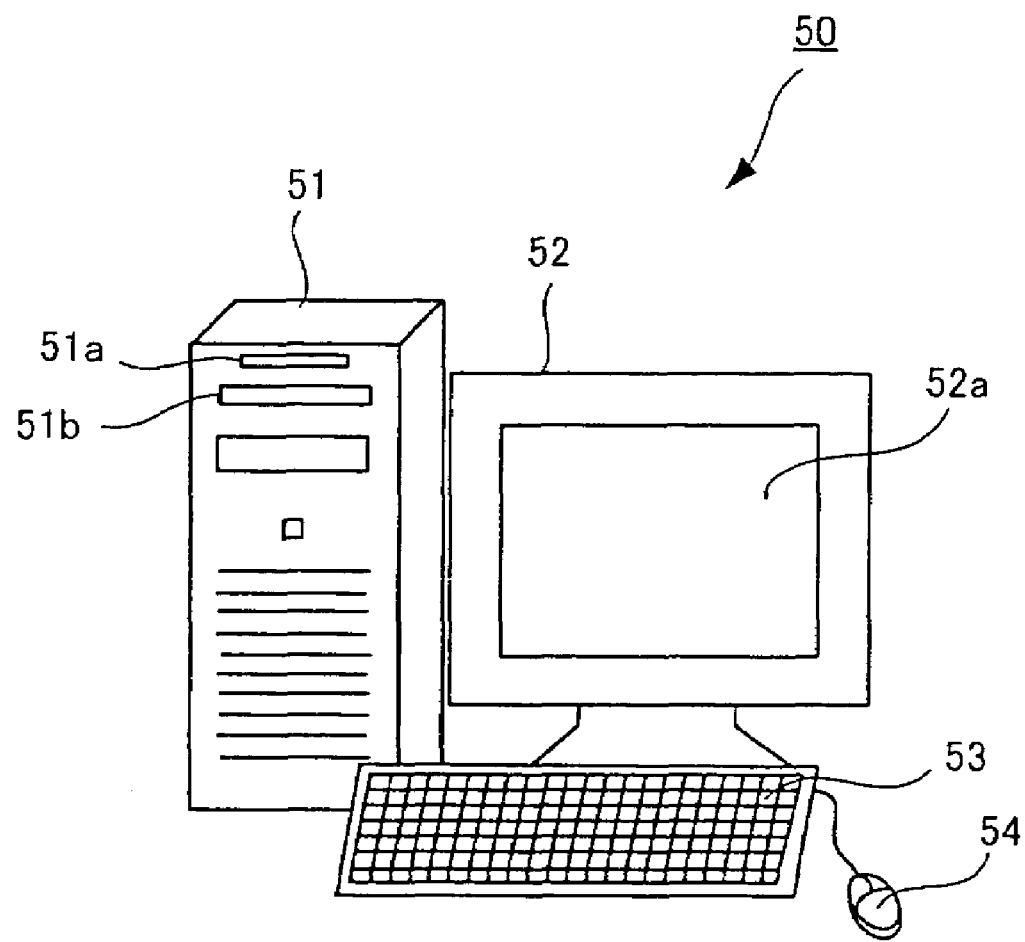
FIG. 15 is a perspective view of a personal computer shown in FIG. 1.
Figure 16:
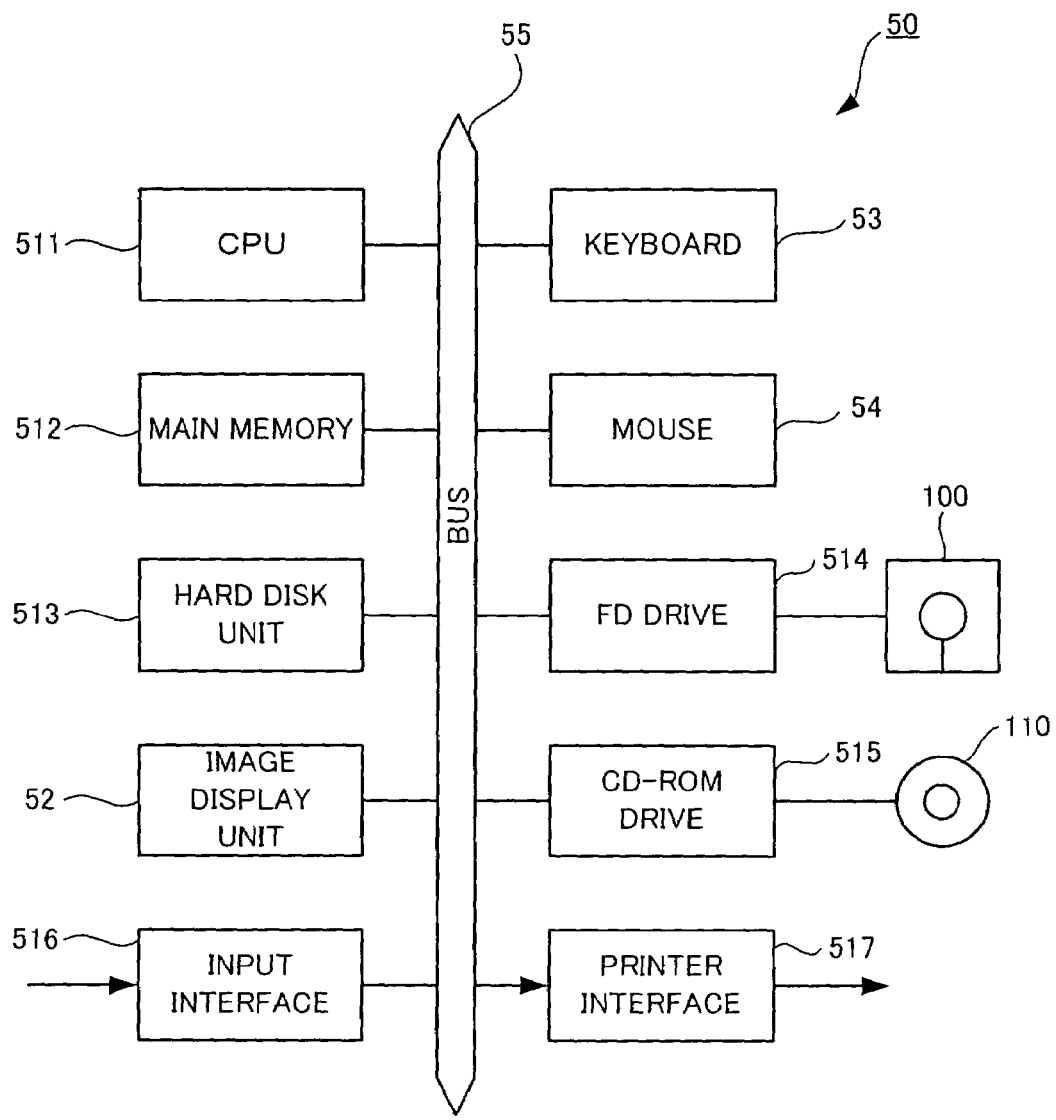
FIG. 16 is a hardware structural view of the personal computer shown in FIG. 11.

FIG. 15 is a perspective view of the personal computer 50 shown in FIG. 1. FIG. 16 is a hardware structural view of the personal computer 50 shown in FIG. 15.

The personal computer 50 comprises, on an external appearance, a main frame unit 51, an image display unit 52 for displaying an image on a display screen 52a in accordance with an instruction from the main frame unit 51, a keyboard 53 for inputting various sorts of information to the main frame unit 51 in accordance with a key operation, and a mouse 54 for inputting an instruction according to, for example, an icon and the like, through designation of an optional position on the display screen 52a, the icon and the like being displayed on the position on the display screen 52a. The main frame unit 51 has a flexible disk (FD) mounting slot 51a for mounting a flexible disk (FD), and a CD-ROM mounting slot 51b for mounting a CD-ROM.

The main frame unit 51 comprises, as shown in FIG. 16, a CPU 511 for executing a various types of program, a main memory 512 in which a program stored in a hard disk unit 513 is read out and developed for execution by the CPU 511, the hard disk unit 513 for saving various types of programs and data, an FD drive 514 for accessing a flexible disk 100 mounted thereon, a CD-ROM drive 515 for accessing a CD-ROM 110 mounted thereon, an input interface 516 connected to the workstation 20 shown in FIG. 1 to receive image data from the workstation 20, and a printer interface 517 connected to the printer 60 to transmit image data to the printer 60. These various types of elements are connected via a bus 55 to the image display unit 52, the keyboard 53 and the mouse 54, which are also shown in FIG. 15.

Figure 17:
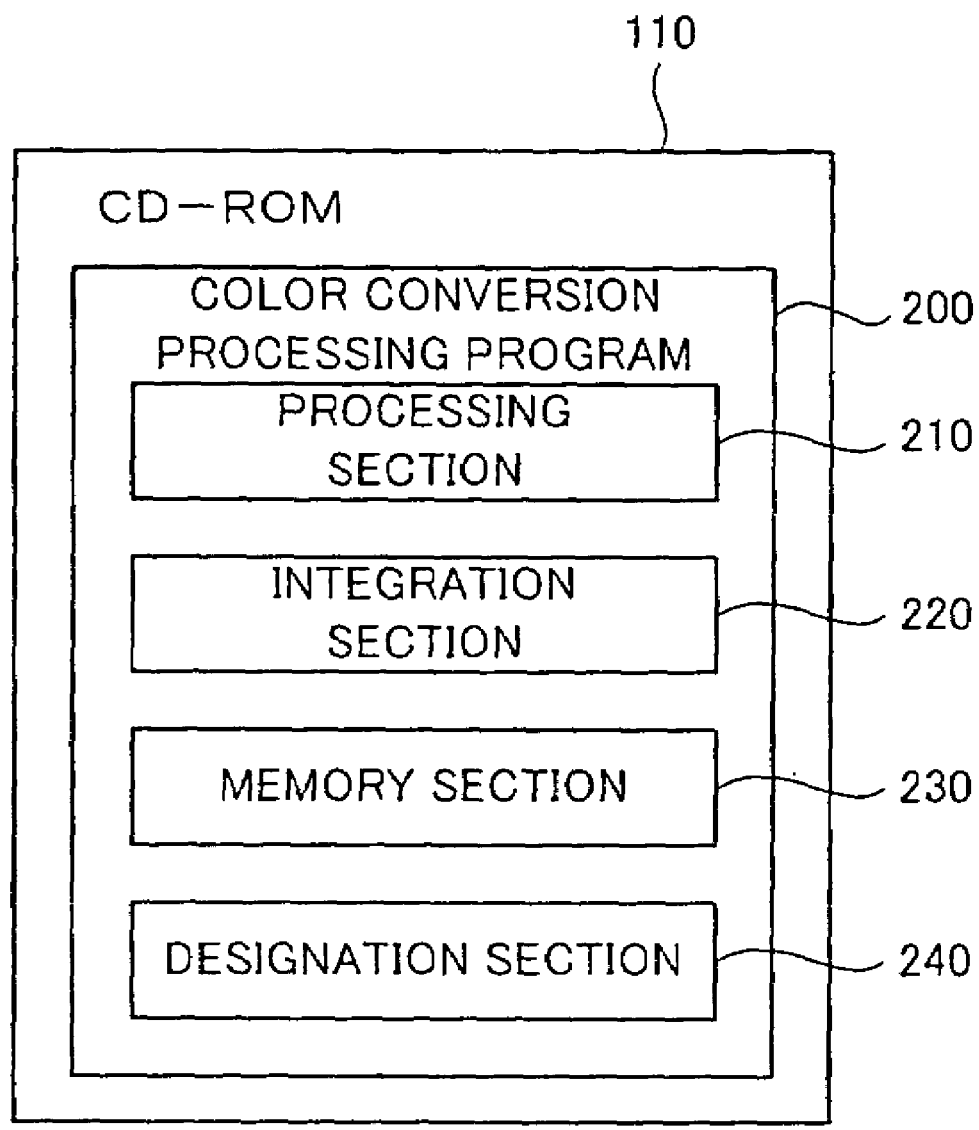
FIG. 17 is a conceptual view of a CD-ROM storing a color conversion processing program stored in a color conversion program storage medium according to an embodiment of the present invention.

FIG. 17 is a conceptual view of a CD-ROM storing a color conversion processing program stored in a color conversion program storage medium according to an embodiment of the present invention.

The CD-ROM 110 stores a color conversion processing program 200 comprising a processing section 210, an integration section 220, a memory section 230 and a designation section 240.

The CD-ROM 110 storing a color conversion processing program 200 shown in FIG. 15 is mounted on the CD-ROM drive 515 of the personal computer 50 shown in FIG. 15 and FIG. 16 so that the color conversion processing program 200 stored in the CD-ROM 110 is up-loaded onto the personal computer 50 and is stored in the hard disk unit 513. When the color conversion processing program 200 stored in the hard disk unit 513 is developed onto the main memory 512 shown in FIG. 2 and then executed in the CPU 511, the personal computer 50 serves as the embodiment of the color conversion processing apparatus of the present invention.

Functions of the respective sections 210 to 240 of the color conversion processing program 200 shown in FIG. 17 will be described latter.

Figure 18:
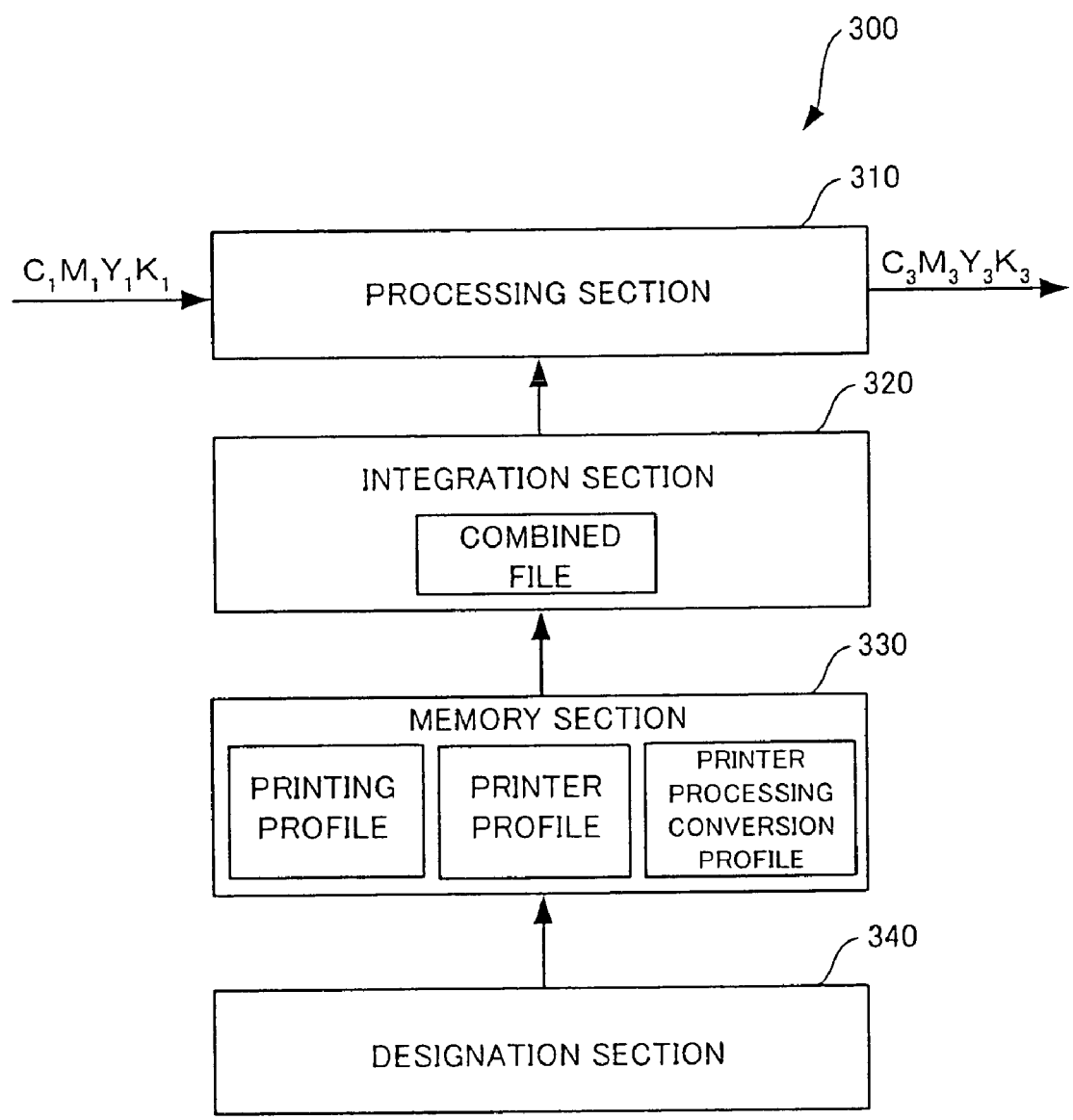
FIG. 18 is a functional block diagram showing an embodiment of a color conversion processing apparatus of the present invention.

FIG. 18 is a functional block diagram showing an embodiment of a color conversion processing apparatus of the present invention.

A color conversion processing apparatus 300 shown in FIG. 18 is constructed in the personal computer 50 shown in FIG. 15 and FIG. 16 when the color conversion processing program 200 shown in FIG. 17 is installed in the personal computer 50 and is executed.

The color conversion processing apparatus 300 shown in FIG. 18 comprises a processing section 310, an integration section 320, a memory section 330 and a designation section 340. The processing section 210, the integration section 220, the memory section 230 and the designation section 240, which constitute the color conversion processing program 200 shown in FIG. 17, correspond to the processing section 310, the integration section 320, the memory section 330 and the designation section 340 of the color conversion processing apparatus 300 shown in FIG. 18, respectively. While the respective sections 310 to 340 of the color conversion processing apparatus 300 shown in FIG. 18 comprise hardware, an operating system (OS) and an application program of the personal computer 50, the respective sections 210 to 240 of the color conversion processing program 200 shown in FIG. 17 comprises only the application program. The functions of the respective sections 210 to 240 of the color conversion processing program 200 in FIG. 17, where the color conversion processing program 200 shown in FIG. 17 is installed in the personal computer 50 and then executed, are quite the same as the functions of the respective sections 310 to 340 of the color conversion processing apparatus 300 in FIG. 18. And thus the explanation of the functions of the respective sections 310 to 340 of the color conversion processing apparatus 300 in FIG. 18 serves as the explanation of the functions of the respective sections 210 to 240 of the color conversion processing program 200 in FIG. 17.

The memory section of the color conversion processing apparatus 300 in FIG. 18 stores the printing profile, the printer profile and the printer processing conversion profile, which are explained referring to FIG. 2 to FIG. 14. FIG. 18 representatively shows the printing profile, the printer profile and the printer processing conversion profile one by one. However, typically, there exists a plurality of profiles for each sort of profile, and the memory section 330 stores all the profiles.

The designation section 340 designates from among the profiles stored in the memory section 330 the printing profile according to the printing condition for the printing machine 40 (cf. FIG. 1) of interest and the printer profile according to the print condition for the printer 60 to output the proof image in accordance with an operator's operation.

According to the present embodiment, ID is applied to the link profile consisting of a pair of the specified printing profile and the specified printer profile, and the designation section 340 directly designates ID of the link profile. This makes it possible to designate the printing profile and the printer profile through the link profile. The integration section 320 receives the printing profile and the printer profile designated in the designation section 340 and in addition a printer processing conversion program to be designated in accordance with the designated printer profile, which are read from the memory section 330, so that the integration section 320 creates a combined profile through integration of those three sorts of profiles. The profile integration processing at the integration section 320 corresponds to the processing of the step (b) of the color conversion processing method shown in FIG. 2.

The combined profile created in the integration section 320 is fed to the processing section 310 to perform a color conversion processing that the image data of $C_1M_1Y_1K_1$ fed from the workstation 20 of FIG. 1 is converted into the image data of $C_3M_3Y_3K_3$ represented by the coordinates in the restricted area on the color space suitable for the printer 60. The color conversion processing in the processing section 310 corresponds to the step (c) of the color conversion processing method shown in FIG. 2.

The image data of $C_3M_3Y_3K_3$ after the conversion processing by the processing section 310 is transmitted to the printer 60 shown in FIG. 1. The printer 60 prints out the proof image 61 in accordance with the image data.

According to the color conversion processing apparatus 300, there is no need to perform the color conversion processing by the printer conversion processing section after the color conversion processing by the profile, which is needed for the conventional color conversion processing apparatus, and thus it is possible to expect a high speed color conversion processing.

Incidentally, according to the present embodiment, the printer conversion processing profile is, as shown in FIG. 2 and FIG. 7, to perform a mapping of the coordinates on the CMYK color space to the coordinates on the same CMYK color space. However, it is acceptable that the color space at the input side of the printer conversion processing profile is different from the color space at the output side of the printer conversion processing profile. For example, it is acceptable that the input side is concerned with the RGB space, while the output side is concerned with the CMYK space. In this case, as the printer profile, there is created a profile for coupling between the XYZ color space and the RGB color space at the input side of the printer conversion processing profile.

Further, according to the present embodiment, as the common color space, there is adopted the XYZ color space. However, it is acceptable that the L*a*b* color space is adopted instead of the XYZ color space. Any one is acceptable, as the common color space, which is a color space common to the printing profile and the printer profile.

Furthermore, according to the present embodiment, as shown in FIG. 2, when the combined profile is created, first there is created a link profile through coupling the printing profile with the printer profile, and then the link profile is combined with the printer processing conversion profile to create the combined profile. This shows a two-stage of coupling processing in which the printer processing conversion profile is newly coupled with the link profile, which is conventionally created. However, it is acceptable that three types of profiles of the printing profile, the printer profile and the printer processing conversion profile are simultaneously coupled with one another without a separation of the coupling processing into two stages.

Still further, according to the present embodiment, as an example of the target device, the printing machine is explained. However, it is acceptable that a printer, which is different from the printer 60 shown in FIG. 1, instead of the printing machine, is provided as a target device, and a profile (a target profile) of the target device is adopted instead of the printing profile.

As mentioned above, according to the present invention, it is possible to perform a data processing for images with a common printer conversion processing section independently of a printer and also to perform a flexible alteration of the processing method.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion processing method comprising steps of:

preparing three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

combining the three types of profiles to create a combined profile providing an association between the coordinates on the target color space and the coordinates in the area subjected to the restriction on the first printer color space; and performing a color conversion processing in which image data for a target having color information represented by the coordinates on the target color space is converted into image data for a printer having color information represented by the coordinates in the area subjected to the restriction on the first printer color space in accordance with the combined profile.

2. A color conversion processing apparatus comprising:

a memory section that stores three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

a profile integration section that combines the three types of profiles to create a combined profile providing an association between the coordinates on the target color space and the coordinates in the area subjected to the restriction on the first printer color space; and a color conversion processing section that performs a color conversion processing in which image data for a target having color information represented by the coordinates on the target color space is converted into image data for a printer having color information represented by the coordinates in the area subjected to the restriction on the first printer color space in accordance with the combined profile.

3. A color conversion processing apparatus according to claim 2, further comprising a profile designation section that designates a pair of a desired target profile and a desired printer profile, wherein the profile integration section combines the target profile and the printer profile designated by the profile designation section with a printer processing conversion profile associated with the printer profile to create the combined profile.

4. A color conversion processing program storage medium storing a color conversion processing program which causes an information processing apparatus to operate as a color conversion processing apparatus, the color conversion processing apparatus comprising:

a memory section that stores three types of profiles consisting of a target profile providing an association between coordinates on a target color space depending on a predetermined target device and coordinates on a predetermined common color space, a printer processing conversion profile providing an association between coordinates in an area subjected to a restriction according to a predetermined printer on a first printer color space depending on the printer and coordinates, where the restriction is removed, on a second printer color space depending on the printer, and a printer profile providing an association between the coordinates, where the restriction is removed, on the second printer color space, and the coordinates on the common color space;

a profile integration section that combines the three types of profiles to create a combined profile providing an association between the coordinates on the target color space and the coordinates in the area subjected to the restriction on the first printer color space; and a color conversion processing section that performs a color conversion processing in which image data for a target having color information represented by the coordinates on the target color space is converted into image data for a printer having color information represented by the coordinates in the area subjected to the restriction on the first printer color space in accordance with the combined profile.

5. A color conversion processing program storage medium according to claim 4, wherein color conversion processing apparatus further comprises a profile designation section that designates a pair of a desired target profile and a desired printer profile, and wherein the profile integration section combines the target profile and the printer profile designated by the profile designation section with a printer processing conversion profile associated with the printer profile to create the combined profile.

* * * * *